United States Patent [19]

Vcelka et al.

[11] 4,049,034

[45] Sept. 20, 1977

[54] ATTACHING MEANS AND METHOD FOR ATTACHING FLEXIBLE TUBING TO A PLASTIC CONTAINER

[75] Inventors: John Leonard Vcelka, Zion; David A. Winchell, Twin Lakes, both of Wis.

[73] Assignee: Baxter Travenol Laboratories, Inc., Deerfield, Ill.

[21] Appl. No.: 705,319

[22] Filed: July 14, 1976

[51] Int. Cl.² .............................................. B32B 5/22
[52] U.S. Cl. ........................................ 150/8; 156/69; 156/73.1; 215/232; 285/242; 285/423; 428/36
[58] Field of Search ................ 215/31, 307 X, 232 X; 150/8; 285/242, 248, 249, 423 X; 156/73.1; 428/36; 156/69

[56] References Cited

U.S. PATENT DOCUMENTS

| | | | |
|---|---|---|---|
| 2,000,481 | 5/1935 | Harrison | 285/248 |
| 3,315,986 | 4/1967 | Quick | 285/242 |
| 3,514,060 | 5/1970 | Hubinger et al. | 285/242 |
| 3,674,290 | 7/1972 | McNally | 285/248 |
| 3,728,184 | 4/1973 | Burke et al. | 156/73.1 |
| 3,888,523 | 6/1975 | Bartholomew | 285/423 |
| 3,963,026 | 6/1976 | Herb | 150/8 |

*Primary Examiner*—Edward G. Whitby
*Attorney, Agent, or Firm*—George Gerstman; Paul C. Flattery; John P. Kirby, Jr.

[57] ABSTRACT

There is provided an improved means and method for attaching a flexible tube to a container of the type having a stub tube port with an end of the tube fitted over the stub port. The attaching means includes a resilient ring tightly fitted over the tube end and a retainer cap fitted over the ring and bonded to the container.

11 Claims, 2 Drawing Figures

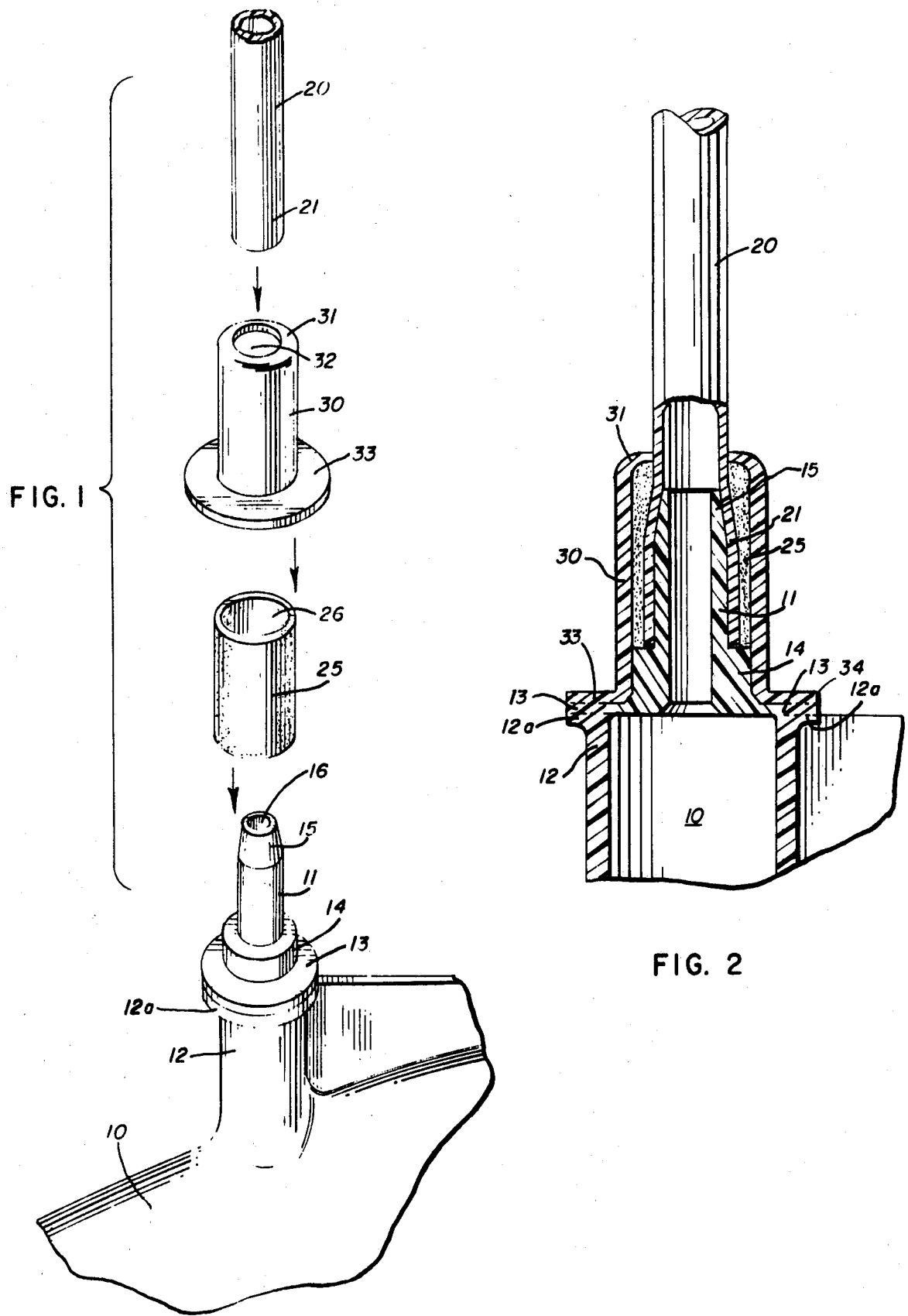

ATTACHING MEANS AND METHOD FOR ATTACHING FLEXIBLE TUBING TO A PLASTIC CONTAINER

BACKGROUND OF THE INVENTION

Medical liquid containers having a flexible tube attached thereto are commonly provided for various medical and hospital uses, such as a blood storage container having a permanently attached flexible tube, or a container for dispensing intravenous fluids. Such containers are commonly made of thermoplastic material.

Heretofore flexible tubes have commercially been attached to the stub port of plastic containers with solvents or adhesives. The elimination of such solvents or adhesives is often desirable.

Moreover, the previous methods of attachments generally required that the plastic container material and plastic tube material be the same. It is sometimes desirable that the material of the container and the material of the tube be different, for example, polyvinylchloride tube and polypropylene container and port.

SUMMARY OF THE INVENTION

There is provided an improved attaching means for attaching a flexible tube to a container of the type having a stub port. Such container and tube assemblies are in common use in the medical and hospital fields.

In accordance with the present invention, an end of the flexible tube is fitted over the stub port. A tight fitting resilient ring is fitted over the tube end and a retainer cap is tightly fitted over the ring. The retainer cap is bonded to the container, as by fusing with heat or with a sonic weld. The ring and retainer cap squeeze the tube end tightly against the stub port, The retainer cap includes an inner lip for preventing axial movement of the resilient ring.

A more detailed explanation of the invention is provided in the following description and claims, and is illustrated in the accompanying drawings.

BRIEF DESCRIPTION OF THE DRAWINGS

FIG. 1 is a fragmentary exploded perspective view of the container and tube assembly; and FIG. 2 is a fragmentary sectional view of the container and tube assembly.

DETAILED DESCRIPTION OF THE ILLUSTRATIVE EMBODIMENT

Referring now to the drawings, there is fragmentarily illustrated a medical type container 10 of suitable thermoplastic material, such as polypropylene. A stub port 11 is attached to the container 10 such as by heat sealing to a rim 12a formed with a neck portion 12 of the container. The stub port 11 has a planar abutment 13 on the rim 12a and is provided with an annular spacer and seat 14 proximate to the abutment. The upper end of the stub port 11 contains a gradual taper 15 to guide and expand the end of a tube 20. A passageway 16 extends through to the neck portion 12 of the container 10.

The tube 20 of suitable thermoplastic material, such as polyvinylchloride, is assembled over the stub port 11 with one end 21 thereof slightly expanded into a tight or friction fit on the stub port, and the end 21 seated against the spacer 14.

A resilient generally cylindrical ring 25 of rubber or other suitable material is tightly fit over the tube end 21 and, in the illustrative embodiment, extends along the length of the taper 15 and slightly beyond the end of the stub port 11. The material of which ring 25 is formed is such that it presents a very high coefficient of friction between ring 25 and tube end 21.

A retainer cap 30 of suitable thermoplastic material, such as polypropylene, is tightly fitted over the ring 25 and includes an inwardly extending annular lip 31 along its upper end and defining an opening 32 closely receiving the tube 20. An outwardly extending flange 33 is provided at the lower end of the retaining cap seated on the abutment 13 and bonded thereto. In the illustrative embodiment, the bond is a sonic weld 34, although other types of seals may be used.

The inner lip 31 permanently holds ring 25, preventing axial movement thereof, and prevents the tube 20 from being pulled off. Advantageously, solvents and adhesives have been eliminated. Moreover, the container and tube may be of the same or different materials.

Although an illustrative embodiment of the invention has been shown and described, it is to be understood that various modifications and substitutions may be made by those skilled in the art without departing from the novel spirit and scope of the present invention.

What is claimed is:

1. An improved attaching means for permanently attaching a flexible tube to a stub port of a container of the type wherein an end of the tube is fitted over the stub port, said attaching means comprising a tight-fitting resilient ring fitted over the tube end and over the stub port sealing the tube end against the stub port, and a retainer cap fitted over the ring, said retainer cap being rigidly connected to said container, said retaining cap and ring resiliently squeezing the tube around the stub port, said retainer cap including an inwardly turned lip for preventing axial movement of said resilient ring.

2. The improved attaching means set forth in claim 1, wherein said tube end is expansion fit over said port.

3. The improved attaching means set forth in claim 2, wherein said container and tube are formed of different materials.

4. The improved attaching means set forth in claim 2, wherein said ring extends past the end of the stub port.

5. The improved attaching means set forth in claim 1, wherein said ring is formed of a material which presents a high coefficient of friction between the ring and the flexible tube.

6. The improved attaching means set forth in claim 2, wherein the port tube is provided with a planar abutment, and said cap has an outwardly turned flange seated against the abutment, said flange being bonded to said abutment.

7. The improved attaching means as set forth in claim 6, wherein said flange is fused to said abutment and said abutment is fused to said container.

8. The improved attaching means as set forth in claim 7, wherein said flange-abutment fuse is a sonic weld.

9. An improved attaching means for permanently attaching a flexible plastic tube to a plastic stub port of a container, the improvement comprising, in combination: said tube end being expansion fit over said port to form a tight frictional engagement with said port; a tight-fitting resilient ring fitted over said tube end and over the stub port sealing the tube end against the stub port, said ring extending past the end of said stub port; and a retainer cap fitted over the ring, said retainer cap having an inwardly turned lip at its upper end retaining the ring, one of said container and stub port being provided with an abutment, and said cap having an outwardly turned flange seated against and bonded to said abutment, said retaining cap and ring resiliently squeezing the tube around the stub port.

10. A method for permanently attaching a flexible plastic tube to a plastic stub port of a container of the type wherein the container and/or the stub port is provided with an abutment, the improvement comprising the steps of: fitting an end of the flexible plastic tube over the stub port; fitting a resilient ring over the tube end and over the stub port to seal the tub end against the stub port; fitting a plastic retainer cap having an outwardly turned flange over the ring; and bonding said retainer cap to said abutment.

11. The method as described in claim 10, wherein said bonding step includes sonic welding of said flange to said abutment.

* * * * *